(12) United States Patent
Ishikawa (10) Patent No.: US 8,791,803 B2
(45) Date of Patent: Jul. 29, 2014

(54) ABNORMALITY DETECTION APPARATUS

(75) Inventor: Tomoyasu Ishikawa, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 564 days.

(21) Appl. No.: 13/112,248

(22) Filed: May 20, 2011

(65) Prior Publication Data

US 2011/0221613 A1 Sep. 15, 2011

Related U.S. Application Data (63) Continuation of application No. 12/349,659, filed on Jan. 7, 2009, now abandoned.

(30) Foreign Application Priority Data

Jan. 11, 2008 (JP) .................................. 2008-004306

(51) Int. Cl.
*B60Q 1/00* (2006.01)

(52) U.S. Cl.
USPC ........ 340/438; 340/425.5; 340/439; 701/29.1

(58) Field of Classification Search
USPC ...................... 340/425.5, 438, 439; 701/29.1
See application file for complete search history.

(56) References Cited

U.S. PATENT DOCUMENTS

| 4,548,079 | A | * | 10/1985 | Klatt ............................ 73/865 |
| 4,847,591 | A | | 7/1989 | Ota et al. |
| 5,142,474 | A | | 8/1992 | Miyata et al. |
| 5,379,224 | A | * | 1/1995 | Brown et al. .................. 701/482 |
| 5,565,856 | A | | 10/1996 | Takaba et al. |
| 6,882,410 | B2 | | 4/2005 | Asahina et al. |
| 7,004,019 | B2 | | 2/2006 | Fischer et al. |
| 2002/0032511 | A1 | | 3/2002 | Murakami et al. |
| 2002/0093419 | A1 | | 7/2002 | Nakayama et al. |
| 2002/0186126 | A1 | | 12/2002 | Umemoto |
| 2003/0112134 | A1 | | 6/2003 | Amagasa |
| 2005/0097949 | A1 | | 5/2005 | Hillenmayer et al. |

FOREIGN PATENT DOCUMENTS

| DE | 41 070 330 C2 | 9/1991 |
| DE | 196 00 734 A1 | 7/1997 |
| DE | 101 45 571 A1 | 3/2003 |
| DE | 101 51 982 A1 | 4/2003 |
| EP | 1 256 476 A2 | 11/2002 |
| JP | 06-286535 A | 10/1994 |
| JP | 2002-144864 A | 5/2002 |
| JP | 2004-268633 A | 9/2004 |
| JP | 2004-284430 A | 10/2004 |
| JP | 2005-219660 A | 8/2005 |
| JP | 2005-300390 A | 10/2005 |
| JP | 2005-335590 A | 12/2005 |
| JP | 2006-096242 A | 4/2006 |
| JP | 2006-349428 A | 12/2006 |
| JP | 2007-118701 A | 5/2007 |

* cited by examiner

*Primary Examiner* — Brent Swarthout
(74) *Attorney, Agent, or Firm* — Sughrue Mion, PLLC (57) ABSTRACT

An abnormality detection apparatus has: an abnormality detection portion that detects at least one of an abnormality of a vehicle and an abnormality of an in-vehicle device based on an output of the in-vehicle device that indicates a state of a vehicle; an environmental drive condition information obtaining portion that obtains information regarding an environmental drive condition that affects the output of the in-vehicle device; and an abnormality detection criteria changing portion that changes an abnormality detection criteria used by the abnormality detecting portion based on the environmental drive condition information obtained by the environmental drive condition information obtaining portion.

6 Claims, 7 Drawing Sheets

ABNORMALITY DETECTION APPARATUS

INCORPORATION BY REFERENCE

This is a Continuation Application of application Ser. No. 12/349,659, filed Jan. 7, 2009 now abandoned, which claims benefit from Japanese Patent Application No. 2008-004306 filed on Jan. 11, 2008, the entire contents of which are incorporated herein by reference.

BACKGROUND OF THE INVENTION

1. Field of the Invention

The invention relates to an abnormality detection apparatus for a vehicle that detects an abnormality of the vehicle or an abnormality of an in-vehicle device provided in the vehicle.

2. Description of the Related Art

Japanese Patent Application Publication No. 2006-349428 (JP-2006-349428) describes an abnormality diagnosis apparatus that diagnoses abnormalities that occur in a vehicle.

This abnormality diagnosis apparatus collects, via communication, information regarding the abnormalities detected in other vehicles. When a specific abnormality is detected in a specific vehicle, control signals are transmitted to other vehicles of the same and similar kinds in order to loose the abnormality detection criterion applied in the respective vehicles to facilitate detection of said specific abnormality in other vehicles. In this manner, information on the specific abnormality can be aggressively collected.

As such, the abnormality diagnosis apparatus of JP-2006-349428 extracts the particulars of the vehicle state and the environmental drive conditions that are common among the vehicles in each of which the specific abnormality has been detected, and then it analyzes the extracted particulars to identify the conditions under which the specific abnormality tends to occur. Using the result of such analysis, the abnormality diagnosis apparatus enables more efficient identification of the location of the abnormality and more efficient repairing.

JP-A-2006-349428 describes that the information on the conditions of the specific abnormality that are identified through the analysis by the abnormality diagnosis apparatus is utilized in dealerships, auto-repair shops, and so on, to identify the location of the abnormality and fix it. However, JP-2006-349428 does not describe any other methods for utilizing the information on the conditions of the abnormality, leaving room for more effective use of said information.

SUMMARY OF THE INVENTION

The invention provides an abnormality detection apparatus that detects at least one of an abnormality of a vehicle and an abnormality of an in-vehicle device while minimizing the possibility of erroneous abnormality detections in consideration of the conditions under which said abnormalities tend to occur.

The first aspect of the invention relates to an abnormality detection apparatus for a vehicle, having: an abnormality detection portion that detects at least one of an abnormality of the vehicle and an abnormality of an in-vehicle device provided in the vehicle based on an output of the in-vehicle device that indicates a state of a vehicle; an environmental drive condition information obtaining portion that obtains information regarding an environmental drive condition that affects the output of the in-vehicle device; and an abnormality detection criteria changing portion that changes an abnormality detection criteria used by the abnormality detection portion based on the environmental drive condition information obtained by the environmental drive condition information obtaining portion.

The second aspect of the invention relates to an abnormality detection apparatus for a vehicle, having: a provisional abnormality detection portion that provisionally detects at least one of an abnormality of the vehicle and an abnormality of an in-vehicle device provided in the vehicle based on an output of the in-vehicle device that indicates a state of the vehicle; an environmental drive condition information obtaining portion that obtains information regarding an environmental drive condition that affects the output of the in-vehicle device when the provisional abnormality detection portion has detected at least one of an abnormality of the vehicle and an abnormality of the in-vehicle device; and an abnormality detection portion that detects at least one of an abnormality of the vehicle and an abnormality of the in-vehicle device based on the output of the in-vehicle device and the environmental drive condition information obtained by the environmental drive condition information obtaining portion.

Incorporating such structures, the invention provides an abnormality detection apparatus that reliably detects at least one of an abnormality of a vehicle and an abnormality of an in-vehicle device while minimizing the possibility of erroneous abnormality detections in consideration of the conditions under which said abnormalities tend to occur.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EMBODIMENTS

Hereinafter, example embodiments of the invention will be described with reference to the accompanying drawings.

Figure 1:
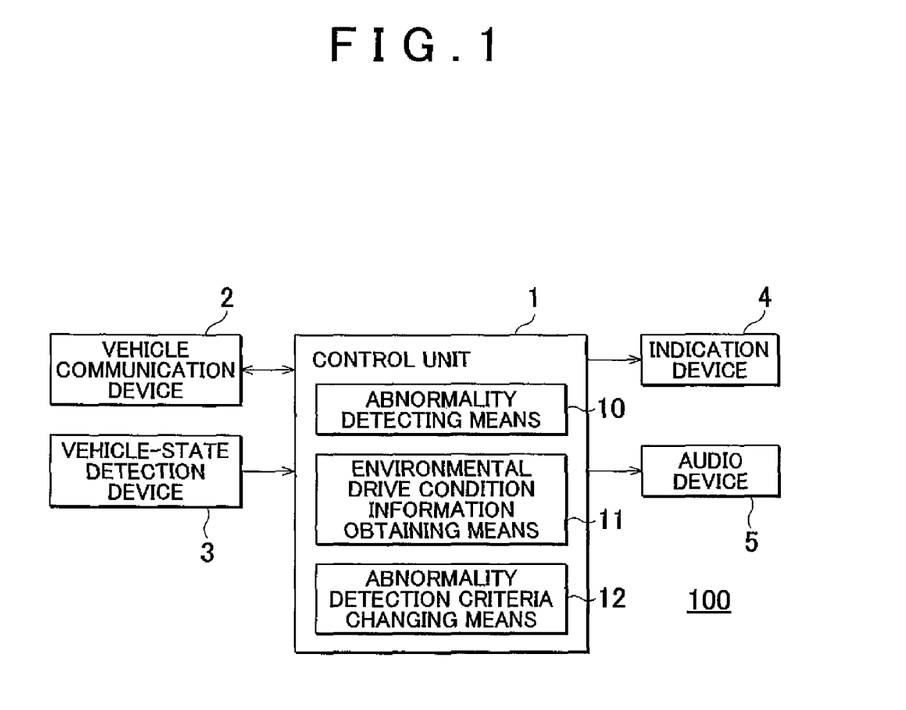
FIG. 1 is a block diagram illustrating an example configuration of an abnormality detection apparatus according to the first example embodiment of the invention.

FIG. 1 is a block diagram illustrating an example configuration of an abnormality detection apparatus 100 according to the first example embodiment of the invention. The abnormality detection apparatus 100 is an apparatus that detects abnormalities of a vehicle or abnormalities of in-vehicle devices. The abnormality detection apparatus 100 is constituted of a control unit 1, a vehicle communication device 2, a vehicle-state detection device 3, an indication device 4, and an audio device 5, which are all connected to each other via an in-vehicle LAN (Local Area Network), such as CAN (Controller Area Network) and LIN (Local Interconnect Network).

The control unit 1 is a computer unit having a CPU (Central Processing Unit), a RAM (Random Access Memory), a ROM (Read Only Memory), a NVRAM (Non-Volatile Random Access Memory), and so on. Abnormality detecting means 10, environmental drive condition information obtaining means 11, and abnormality detection criteria changing means 12 are stored in the ROM in the form of control programs, and the CPU executes various calculations and computations using these means based on the outputs of the vehicle communication device 2 and the vehicle-state detection device 3, and then the CPU outputs control signals corresponding to the results of said calculations and computations to the indication device 4 and the audio device 5.

The abnormality detection apparatus 100 records the information regarding detected abnormalities in the NVRAM, and this information is read out via dedicated diagnosis devices in dealerships, auto-repair shops, and the like.

The vehicle communication device 2 is a device for controlling the communication between the vehicle and external stationary communication centers. For example, the vehicle communication device 2 controls the communication between the vehicle and a communication center that administrates and transmits weather information, and so on, using mobile-phone frequencies or PHS (Personal Handy-Phone System) frequencies.

Alternatively, the vehicle communication device 2 may be connected to a mobile communication device (e.g., mobile phone, PHS) via a wired connection using a cradle or a wireless connection using Bluetooth (registered trademark) and control the communication between the vehicle and the communication center using the mobile communication device.

Further, the vehicle communication device 2 may be a receiver that receives road-surface information, road-classification information, and so on, that are transmitted from road-to-vehicle intercommunication devices that are installed at road shoulders, for example.

The vehicle-state detection device 3 is a device that detects the state of the vehicle and provides information regarding the detected state of the vehicle to the control unit 1. For example, the vehicle-state detection device 3 may be a sensor, such as a vehicle speed sensor, an acceleration sensor, an engine coolant temperature sensor, a transmission lubricant temperature sensor, and an engine speed sensor, or the vehicle-state detection device 3 may be an actuator, such as a brake control device, an accelerator control device, and a steering control device.

The indication device 4 is a device for indicating various informations. For example, the indication device 4 may be a liquid-crystal display, a LED (Light Emitting Diode) lamp, or the like. When an abnormality of the vehicle or an abnormality of the vehicle-state detection device 3 has been detected, the indication device 4 indicates a text message or lights on to inform the driver of the detected abnormality.

The audio device 5 is a device for generating sounds. For example, the audio device 5 may be an in-vehicle speaker, a buzzer, or the like. When an abnormality of the vehicle or an abnormality of the vehicle-state detection device 3 has been detected, the audio device 5 generates a voice message, a warning sound, or the like, to inform the driver of the detected abnormality.

Next, the abnormality detecting means 10, the environmental drive condition information obtaining means 11, and the abnormality detection criteria changing means 12 incorporated in the control unit 1 will be described.

First, the abnormality detecting means 10 is means for detecting, based on the outputs of the vehicle-state detection device 3, an abnormality of the vehicle or an abnormality of the vehicle-state detection device 3 or detecting an abnormality of the signal line between the vehicle-state detection device 3 and the control unit 1. For example, the abnormality detecting means 10 detects abnormalities of the engine coolant temperature sensor and the transmission lubricant temperature sensor, which are both an example of the vehicle-state detection device 3, as follows. That is, the abnormality detecting means 10 determines the engine coolant temperature sensor to be in an abnormal state when the output value of the engine coolant temperature sensor becomes equal to or higher than a predetermined level, and the abnormality detecting means 10 determines the engine coolant temperature sensor to be in an abnormal state that the output value of the engine coolant temperature sensor is fixed to a certain value when the output value of the engine coolant temperature remains lower than a predetermined level for a predetermined time after the start of the engine. Likewise, the abnormality detecting means 10 determines the transmission lubricant temperature sensor to be in an abnormal state when the output value of the transmission lubricant temperature sensor becomes equal to or higher than a predetermined level, and the abnormality detecting means 10 determines the transmission lubricant temperature sensor to be in an abnormal state that the output value of the transmission lubricant temperature sensor is fixed to a certain value when the output value of the transmission lubricant temperature remains lower than a predetermined level for a predetermined time after the start of the engine.

Further, the abnormality detecting means 10 detects the engine speed sensor, which is an example of the vehicle-state detection device 3, to be in an abnormal state when the output value of the engine speed sensor remains zero for a predetermined time while the vehicle is running Note that the abnormality detecting means 10 does not detect the engine speed sensor to be in an abnormal state when the output value of the engine speed sensor momentarily falls to zero. That is, in this case, the abnormality detecting means 10 determines that the momentary fall of the output value of the engine speed sensor has been caused by locking of the tires, not an abnormality of the engine.

Further, when detecting an abnormality of each sensor, the abnormality detecting means 10 determines whether the sensor or the signal line between the control unit 1 and the sensor is in an abnormal state as follows. The abnormality detecting means 10 determines the frequency of intermittent interruptions of the signal transmission from the sensor (will be referred to as "signal transmission interruption frequency" where necessary) and the duration of such signal transmission interruption (will be referred to as "signal transmission interruption duration" where necessary), and the abnormality detecting means 10 determines whether the sensor or its signal line is in an abnormal state based on the signal transmission interruption frequency and the signal transmission interruption duration.

The environmental drive condition information obtaining means 11 is means for obtaining information regarding the environmental drive conditions of the vehicle. For example, the environmental drive condition information obtaining means 11 obtains weather information (e.g., information regarding rainfall amount, temperature, snow, and so on) and road-surface information (e.g., information regarding road roughness, pavement condition, road-surface freezing, road bumps, and so on) that the vehicle communication device 2 periodically receives from corresponding communication centers.

The environmental drive condition information obtaining means 11 may obtain information regarding road classification, road curvature, road gradient, road surface, and so on, through road-to-vehicle intercommunication or may obtain such information based on the map information and the information on the position of the vehicle that are provided from an in-vehicle navigation system.

Further, the environmental drive condition information obtaining means 11 may indirectly obtain information regarding the roughness of the road surface based on the output from the acceleration sensor, which is one example of the vehicle-state detection device 3. Further, the environmental drive condition information obtaining means 11 may indirectly obtain information regarding the state of rainfall based on the outputs of a raindrop sensor and/or based on the outputs of the wipers of the vehicle.

The abnormality detection criteria changing means 12 is means for changing an abnormality detection criteria that the abnormality detecting means 10 refers to when detecting abnormalities of the vehicle, the vehicle-state detection device 3, and its signal line. For example, the abnormality detection criteria changing means 12 changes the abnormality detection criteria based on the environmental drive condition information obtained by the environmental drive condition information obtaining means 11.

For example, in a case where the abnormality detecting means 10 detects an abnormality of the engine coolant temperature sensor as the vehicle-state detection device 3 as mentioned above, when the outside temperature detected by the environmental drive condition information obtaining means 11 is equal to or lower than a threshold temperature, the abnormality detection criteria changing means 12 retards the time (i.e., the time after the engine start) at which the abnormality detecting means 10 determines whether the output value of the engine-coolant temperature has exceeded the aforementioned predetermined level. This is because the lower the outside temperature, the lower the rate of increase in the temperature of the engine coolant.

Further, in a state where the abnormality detection criteria changing means 12 can not directly obtain the outside temperature, the abnormality detection criteria changing means 12 may indirectly estimate the outside temperature from weather information as to whether it is raining or whether it is snowing, season information as to whether it is summer or whether it is winter, time information as to whether it is night, early morning, or daytime, vehicle position information regarding the latitude, longitude, and altitude of the vehicle, and so on, and the abnormality detection criteria changing means 12 may adjust, based on the outside temperature thus estimated, the time at which the abnormality detecting means 10 determines whether the output value of the engine coolant temperature sensor has exceeded the predetermined level.

Further, in a case where the road classification information obtained by the environmental drive condition information obtaining means 11 is indicating that the road on which the vehicle is presently running is an expressway, the abnormality detection criteria changing means 12 may reduce the lubricant temperature threshold that the abnormality detecting means 10 uses when determining whether the output value of the transmission lubricant temperature is abnormal (too low). This is because the transmission lubricant temperature tends to remain low while the vehicle is running on an expressway at a high transmission speed under low load.

Further, in a case where the weather information obtained by the environmental drive condition information obtaining means 11 is indicating that it is raining, the abnormality detection criteria changing means 12 may increase an engine stop duration threshold that, when the output value of the engine speed sensor remains zero, the abnormality detecting means 10 uses to determine whether the engine is in an abnormal state. That is, when the vehicle is running on a wet road surface, the time for which the engine momentarily stops due to locking of the tires caused by slippage tends to be longer than it is when the vehicle is running on a dry road surface.

Further, the abnormality detection criteria changing means 12 may change the engine stop duration threshold in accordance with the road curvature and/or the road gradient.

Further, when determining whether the engine has been stopped due to an abnormality of the engine, the abnormality detecting means 10 may refer to the descending gradient of the engine speed instead of the engine stop duration. In this case, the abnormality detection criteria changing means 12 may change a gradient threshold set for the engine speed descending gradient in accordance with the weather information.

In this manner, it is possible to more reliably avoid erroneously determining that an abnormality of the engine has caused an engine stop that has been actually caused by locking of the tires.

Further, in a case where by the environmental drive condition information obtaining means 11 obtains road-surface information as environmental drive condition information, the abnormality detection criteria changing means 12 may switch the target of the abnormality detection by the abnormality detecting means 10 between the sensor and the signal line of the sensor in accordance with the road roughness indicated by the road-surface information. More specifically, for example, if the frequency of interruptions of signal transmission from the sensor has exceeded a frequency threshold in a state where the road-surface information obtained by the environmental drive condition information obtaining means 11 is indicating that the roughness of the road on which the vehicle is presently running is high, the abnormality detecting means 10 determines that the signal line of the sensor is temporarily disconnected. On the other hand, if the frequency of interruptions of signal transmission from the sensor has exceeded the frequency threshold in a state where the road-surface information obtained by the environmental drive condition information obtaining means 11 is indicating that the roughness of the road on which the vehicle is presently running is low, the abnormality detecting means 10 determines that the sensor is in an abnormal state.

That is, if the connector of the signal line of the sensor is not firmly connected, it increases the possibility of momentary disconnection of the signal line of the sensor due to vibration of the vehicle on a rough road. As such, by changing the abnormality detection target between the sensor and the signal line of the sensor in accordance with the road roughness as described above, it is possible to more accurately distinguish between a signal abnormality due to momentary disconnection of the signal line of the sensor and a signal abnormality due to an abnormality of the sensor.

Further, the abnormality detection criteria changing means 12 may change the above-stated frequency threshold in accordance with the road-surface information. Further, in a case where the abnormality detecting means 10 refers to the duration of interruption of signal transmission from the sensor when determining whether the sensor or its signal line is in an abnormal state, the abnormality detection criteria changing means 12 may change the threshold for said duration in accordance with the road-surface information, or the like.

Figure 2:
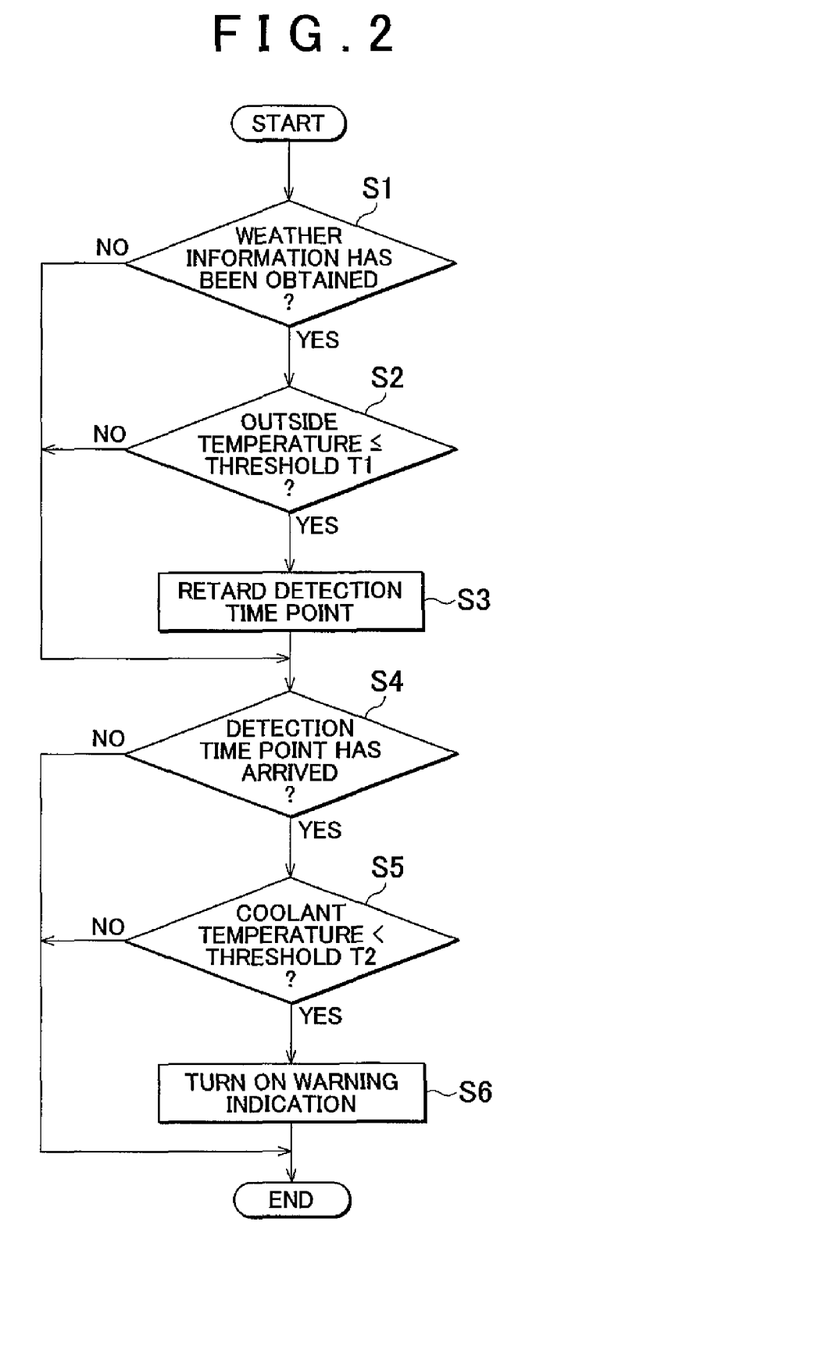
FIG. 2 is a flowchart illustrating the flow of a sensor abnormality detection routine that is executed to detect an abnormality of an engine coolant temperature sensor in the abnormality detection apparatus of the first example embodiment.

Next, a routine that control unit 1 of the abnormality detection apparatus 100 executes to detect an abnormality of the engine coolant temperature sensor (will be referred to as "sensor abnormality detection routine") will be described with reference to FIG. 2. The flowchart of FIG. 2 illustrates the flow of the sensor abnormality detection routine. The control unit 1 of the abnormality detection apparatus 100 repeatedly executes the sensor abnormality detection routine until a predetermined time point after the engine start at which the control unit 1 of the abnormality detection apparatus 100 determines whether the temperature of the engine coolant has exceeded the aforementioned predetermined level.

Referring to the flowchart of FIG. 2, first, the control unit 1 obtains the weather information that the environmental drive condition information obtaining means 11 periodically receives from a communication center via the vehicle communication device 2 (step S1).

If the weather information has been obtained (step S1: YES), the control unit 1 then determines whether the outside temperature of the area in which the vehicle is presently running is equal to or lower than a temperature threshold T1 (step S2). If it is determined in this step that the outside temperature of the area is equal to or lower than the temperature threshold T1 (step S2: YES), the abnormality detection criteria changing means 12 retards the time at which the abnormality detecting means 10 determines whether the output value of the engine coolant temperature sensor has exceeded the predetermined level (step S3).

On the other hand, if it is determined in step S2 that the outside temperature is higher than the temperature threshold T1 (step S2: NO), the control unit 1 proceeds to the next step without retarding the detection time point.

Referring back to step S1, if it is determined in this step that the weather information has not been obtained (step S1: NO), the control unit 1 proceeds to the next step without retarding the detection time point, like when it is determined in step S2 that the outside temperature is higher than the temperature threshold T1.

Then, the control unit 1 determines whether the detection time point has arrived (step S4). If not (step S4: NO), the control unit 1 finishes the present cycle of the sensor abnormality detection routine.

On the other hand, if it is determined in step S4 that the detection time point has arrived (step 4: YES), the abnormality detecting means 10 of the control unit 1 determines whether the output value of the engine coolant temperature sensor is lower than a coolant temperature threshold T2 (step 5). At this time, if the output value of the engine coolant temperature sensor is smaller than the coolant temperature threshold T2 (step S5: YES), the control unit 1 outputs control signals to turn on the indication device 4 (LED lamp) as a warning indication to inform the driver that the sensor is presently in an abnormal state (step S6). Note that, at this time, the control unit 1 may turn on the audio device 5 to generate a voice message or a warning sound instead of or in addition to turning on the indication device 4.

On the other hand, if it is determined in step S5 that the output value of the engine coolant temperature sensor is equal to or larger than the coolant temperature threshold T2, the control unit 1 determines that the engine coolant temperature sensor is properly detecting the temperature of the engine coolant, and the control unit 1 therefore finishes the sensor abnormality detection routine without turning on the indication device 4.

As such, in view of the fact that the temperature of the engine coolant increases at a relatively low rate when the outside temperate is low, if the outside temperature is low, the control unit 1 of the abnormality detection apparatus 100 retards the time at which to determine whether the engine coolant temperature sensor is in an abnormal state. In this manner, the abnormality detection apparatus 100 avoids erroneously detecting an abnormality of the engine coolant temperature sensor.

Further, if the outside temperature is high, the control unit 1 of the abnormality detection apparatus 100 may advance the detection time point so that an abnormality of the engine coolant temperature sensor can be detected earlier.

Figure 3:
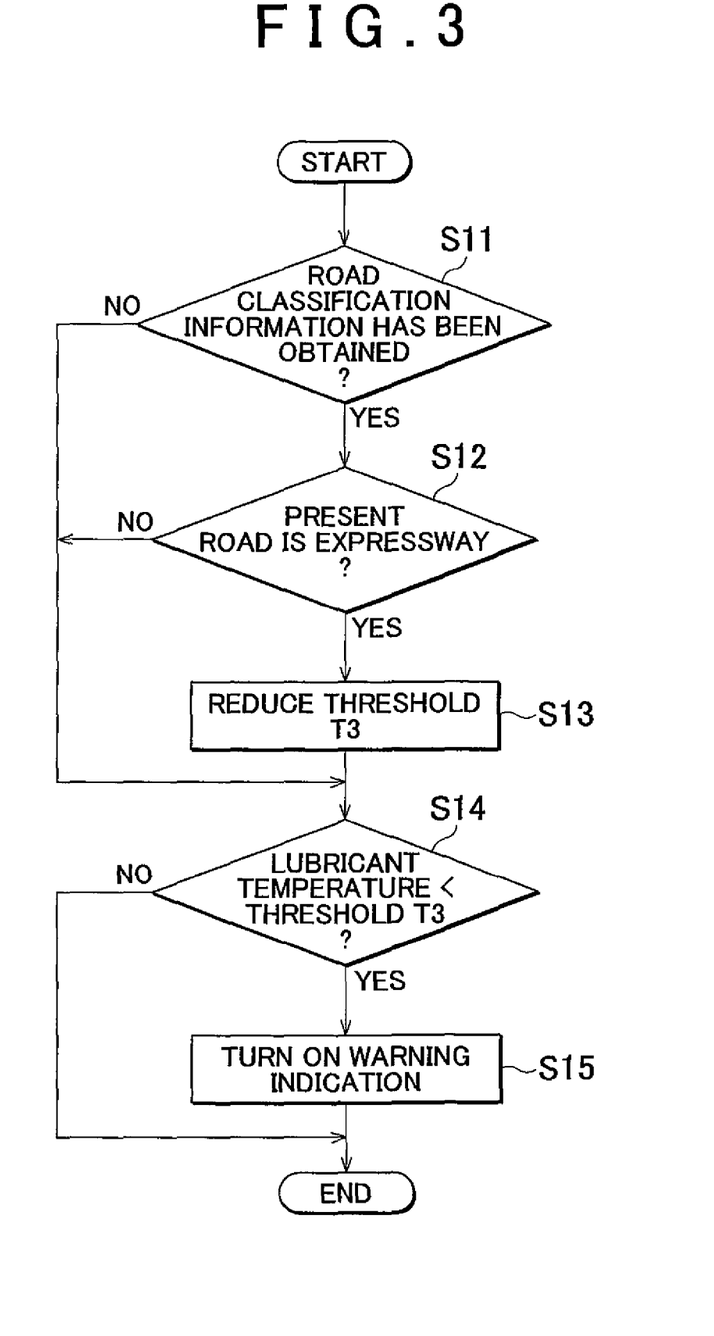
FIG. 3 is a flowchart illustrating the flow of a lubricant temperature abnormality detection routine that is executed in the abnormality detection apparatus of the first example embodiment.

Next, the routine that the control unit 1 of the abnormality detection apparatus 100 executes to detect an abnormality of the temperature of the transmission lubricant (will be referred to as "lubricant temperature abnormality detection routine" where necessary) will be described with reference to FIG. 3. The flowchart of FIG. 3 illustrates the flow of the lubricant temperature abnormality detection routine. The control unit 1 of the abnormality detection apparatus 100 repeatedly executes the lubricant temperature abnormality detection routine at given time intervals while the vehicle is running.

In the lubricant temperature abnormality detection routine, referring to FIG. 3, the control unit 1 first obtains the road classification information that the environmental drive condition information obtaining means 11 receives, via the vehicle communication device 2, from road-to-vehicle intercommunication devices installed at road shoulders (step S11).

If the road classification information has been obtained (step S11: YES), the control unit 1 then determines, based on the received road classification information, whether the road on which the vehicle is presently running is an expressway (step S12). If it is determined that the present road is an expressway (step S12: YES), the abnormality detection criteria changing means 12 of the control unit 1 reduces a lubricant temperature threshold T3 that the abnormality detecting means 10 uses in determining whether the output value of the transmission lubricant temperature sensor is abnormal (step S13).

On the other hand, if it is determined in step S12 that the present road is not an expressway (step S12: NO), the control unit 1 proceeds to the next step without changing the lubricant temperature threshold T3.

Referring back to step S11, if it is determined in this step that the road classification information has not been obtained (step S11: NO), the control unit 1 proceeds to the next step without reducing the lubricant temperature threshold T3, like when it is determined in step S12 that the present road is not an expressway.

Then, the control unit 1 determines whether the output value of the transmission lubricant temperature sensor is smaller than the lubricant temperature threshold T3 (step S14). If the output value is equal to or higher than the lubricant temperature threshold T3 (step S14: NO), the control unit 1 determines that the temperature of the transmission lubricant is normal, and the control unit 1 therefore finishes the present cycle of the lubricant temperature abnormality detection routine.

On the other hand, if it is determined in step S14 that the output value of the lubricant temperature sensor is lower than the lubricant temperature threshold T3 (step S14: YES), the control unit 1 then turns on the indication device 4 as a warning indication to inform the driver that the temperature of the transmission lubricant is too low (step S15).

As such, in view of the fact that the temperature of the transmission lubricant increases at a relatively low rate when the vehicle is running on an expressway at a high transmission speed under low load, the control unit 1 of the abnormality detection apparatus 100 reduces the lubricant temperature threshold T3 when the vehicle is running on an expressway. In this manner, the abnormality detection apparatus 100 avoids erroneously detecting an abnormality of the temperature of the transmission lubricant.

Meanwhile, the temperature of the transmission lubricant tends to increase at a relatively high rate when the vehicle is running on a public road, or the like, at a low transmission speed under high load. In such a case, therefore, the control unit 1 of the abnormality detection apparatus 100 may increase the lubricant temperature threshold T3 so that abnormalities of the transmission lubricant temperature can be more aggressively detected.

Figure 4:
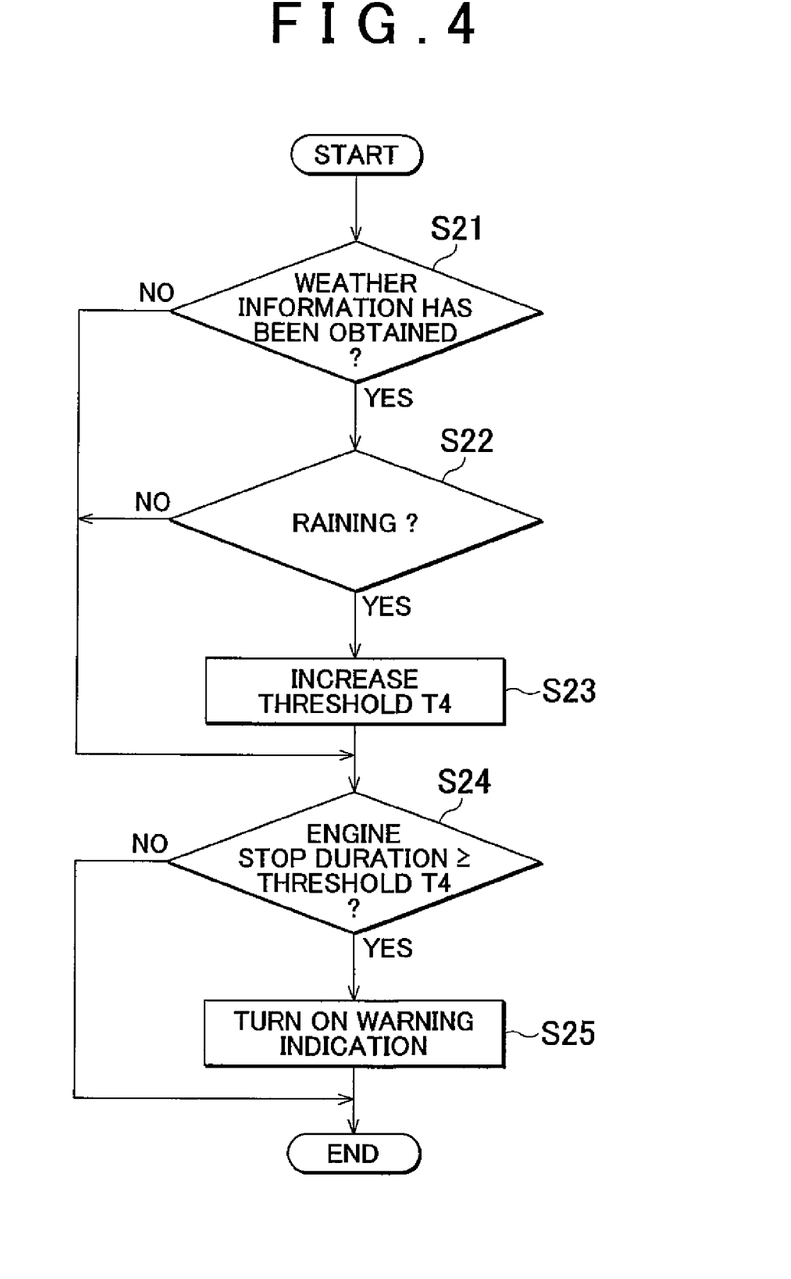
FIG. 4 is a flowchart illustrating the flow of an engine abnormality detection routine that is executed in the abnormality detection apparatus of the first example embodiment.

Next, the routine that the control unit 1 of the abnormality detection apparatus 100 executes to detect an abnormality of the engine (will be referred to as "engine abnormality detection routine" where necessary) will be described with reference to FIG. 4. The flowchart of FIG. 4 illustrates the flow of the engine abnormality detection routine. The control unit 1 of the abnormality detection apparatus 100 repeatedly executes the engine abnormality detection routine at given time intervals while the vehicle is running.

In the engine abnormality detection routine, referring to FIG. 4, the control unit 1 first obtains the weather information that the environmental drive condition information obtaining means 11 regularly receives, via the vehicle communication device 2, from a communication center (step S21).

If the weather information has been obtained (step S21: YES), the control unit 1 then determines whether it is raining in the area in which the vehicle is presently running (step S22). If it is determined that it is raining in said area (step S22: YES), the abnormality detection criteria changing means 12 of the control unit 1 increases an engine stop duration threshold T4 (step S23).

On the other hand, if it is determined in step S22 that it is not raining in said area (step S22: NO), the control unit 1 proceeds to the next step without increasing the engine stop duration threshold T4.

Referring back to step S21, if it is determined in this step that the weather information has not been obtained (step S21: NO), the control unit 1 proceeds to the next step without increasing the engine stop duration threshold T4, like when it is determined in step S22 that it is not raining in the area in which the vehicle is presently running.

Then, the control unit 1 determines whether an engine stop duration is equal to or longer than the engine stop duration threshold T4 (step S24). At this time, if it is determined that the engine stop duration is not yet equal to or longer than the engine stop duration threshold T4 (step S24: NO), the control unit 1 determines that the engine is not in an abnormal state, and the control unit 1 then finishes the present cycle of the engine abnormality detection routine. In this process, as such, even if the engine stops momentarily due to slippage of the tires or the like, the control unit 1 determines that the engine is not in an abnormal state.

On the other hand, if it is determined in step S24 that the engine stop duration is equal to or longer than the engine stop duration threshold T4 (step S24: YES), the control unit 1 determines that the engine has stopped due to an abnormality of the engine, not slippage of the tires. In this case, the control unit 1 turns on the indication device 4 as a warning indication to inform the driver that the engine is presently in an abnormal state (step S25).

As such, when the vehicle is running in rain, the possibility of slippage of the tires is relatively high due to a wet road surface, and therefore, under such a condition, the time for which the engine temporarily stops due to locking of the tires tends to be relatively long. In view of this fact, when it is raining in the area in which the vehicle is presently running, the control unit 1 of the abnormality detection apparatus 100 increases the engine stop duration threshold T4 and detects an abnormality of the engine with reference to the increased engine stop duration threshold T4. In this manner, the abnormality detection apparatus 100 avoids erroneously detecting an abnormality of the engine.

Meanwhile, when the vehicle is running on a dry road surface and thus the possibility of slippage of the tires is low, the control unit 1 of the abnormality detection apparatus 100 may reduce the engine stop duration threshold T4 so that abnormalities of the engine can be more aggressively performed.

Figure 5:
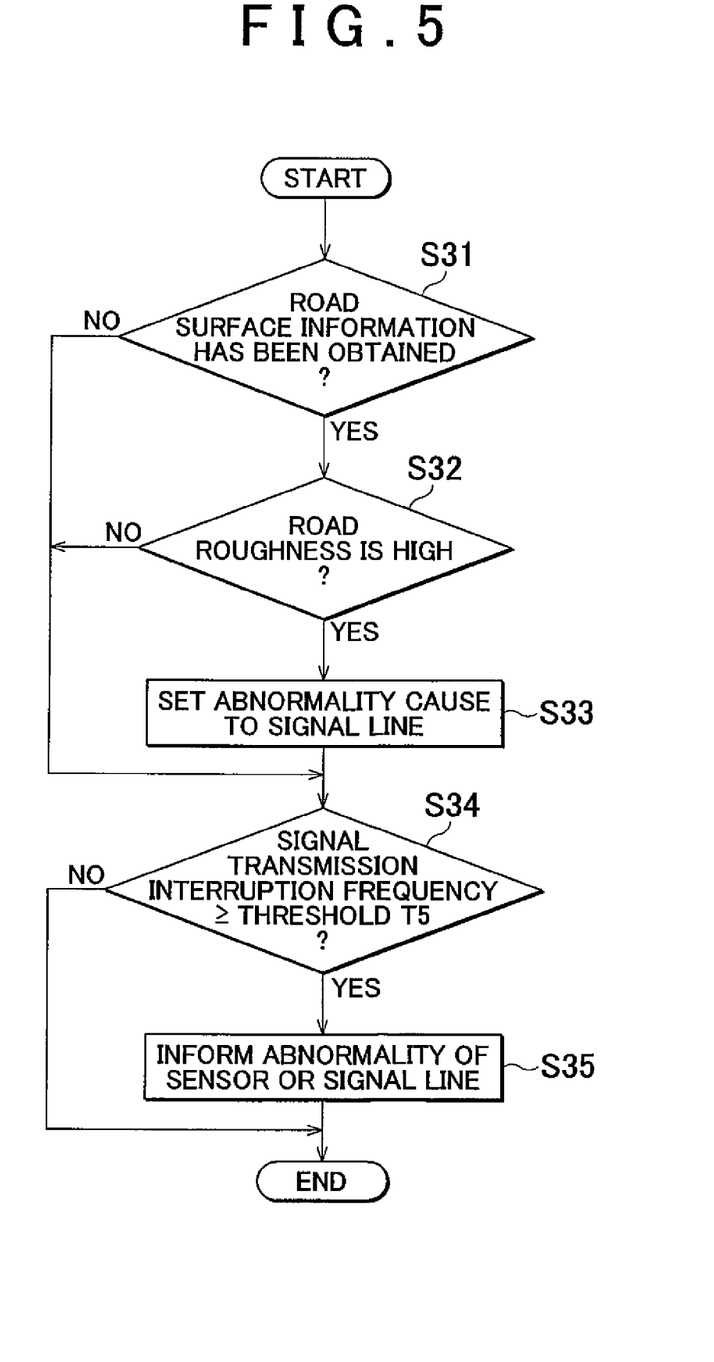
FIG. 5 is a flowchart illustrating the flow of a signal line abnormality detection routine that is executed in the abnormality detection apparatus of the first example embodiment.

Next, the routine that the control unit 1 of the abnormality detection apparatus 100 executes to detect an abnormality of the signal line of each sensor (will be referred to as "signal line abnormality detection routine" where necessary) will be described with reference to FIG. 5. The flowchart of FIG. 5 illustrates the flow of the signal line abnormality detection routine. The control unit 1 of the abnormality detection apparatus 100 repeatedly executes the signal line abnormality detection routine at given time intervals while the vehicle is running.

In the signal line abnormality detection routine, referring to FIG. 5, the control unit 1 first obtains the road surface information that the environmental drive condition information obtaining means 11 receives, via the vehicle communication device 2, from road-to-vehicle intercommunication devices installed at road shoulder (step S31).

If the road-surface information has been obtained (step S31: YES), the control unit 1 then determines whether the roughness of the road surface on which the vehicle is presently running is high or low (step S32). When the frequency of interruptions of signal transmission from the sensor becomes equal to or higher than a frequency threshold T5 within a predetermined time period, the abnormality detecting means 10 outputs a value indicating the cause of said signal transmission interruptions. If it is determined in step S32 that the roughness of the road surface is high (step S32: YES), the abnormality detection criteria changing means 12 of the control units changes said output value of the abnormality detecting means 10 from a value indicating an abnormality of the sensor as the cause of the signal transmission interruptions to a value indicating an abnormality of the signal line of the sensor as the cause of the signal transmissions (step S33).

On the other hand, if it is determined in step S32 that the roughness of the road surface is low (step S32: NO) or if it is determined that the road-surface information has not been obtained (step S31: NO), the control unit 1 proceeds to the next step without changing the output value of the abnormality detecting means 10.

Then, the control unit 1 determines whether the frequency of interruptions of signal transmission from the sensor becomes equal to or higher than the frequency threshold T5 within the predetermined time period (step S34). At this time, if the frequency of interruptions of signal transmission from the sensor within the predetermined time period is still lower than the frequency threshold T5 (step S34: NO), the control unit 1 determines that it is too soon to estimate the cause of the signal transmission interruptions.

On the other hand, if it is determined in step S34 that the frequency of interruptions of signal transmission from the sensor within the predetermined period is equal to or higher than the frequency threshold T5 (step S34: YES), the control unit 1 turns on the indication device 4 as a warning indication to inform the driver that the sensor is presently in an abnormal state or that the signal line between the sensor and the control unit 1 has been disconnected (step S35).

The possibility of disconnection of the signal line between the sensor and the control unit 1 of the abnormality detection apparatus 100 is relatively high when the vehicle is running on a highly rough road surface. In view of this fact, if the signal transmission from the sensor is frequently interrupted while the vehicle is running on a highly rough road surface, the control unit 1 of the abnormality detection apparatus 100 informs the driver that it is highly likely that the signal transmission interruptions have been caused by disconnection of the signal line. In this manner, the abnormality detection apparatus 100 avoids erroneously detecting an abnormality of the sensor.

Meanwhile, if the roughness of the road surface is low and therefore the possibility of disconnection of the signal line between the sensor and the control unit 1 of the abnormality detection apparatus 100 is relatively low, the abnormality detection apparatus 100 may inform the driver that it is highly likely that the interruptions of signal transmission from the sensor have been caused by an abnormality of the sensor. In this case, the abnormality detection apparatus 100 can more reliably prevent overlooking of abnormalities of the sensor.

Figure 6:
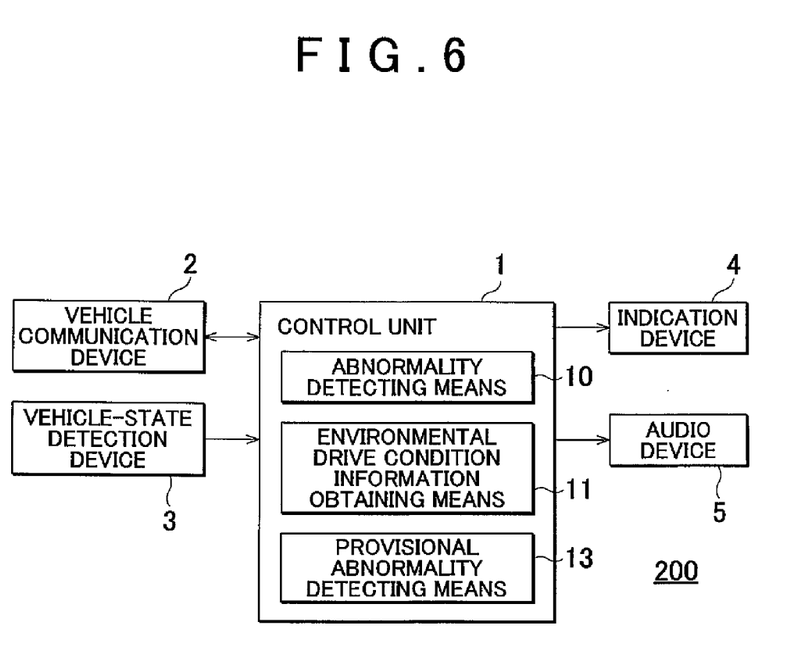
FIG. 6 is a block diagram illustrating an example configuration of an abnormality detection apparatus according to the second example embodiment of the invention.

FIG. 6 is a block diagram illustrating an example configuration of an abnormality detection apparatus 200 according to the second example embodiment of the invention. The configuration of the abnormality detection apparatus 200 is identical to that of the abnormality detection apparatus 100 shown in FIG. 1 except that provisional abnormality detecting means 13 is used in place of the abnormality detection criteria changing means 12.

In the following, therefore, a description will be made of the provisional abnormality detecting means 13, which is the difference of the abnormality detection apparatus 200 from the abnormality detection apparatus 100, and other elements and components of the abnormality detection apparatus 200 will be denoted by the same reference numerals as those used for the elements and components of the abnormality detection apparatus 100.

The provisional abnormality detecting means 13 is means for provisionally detecting an abnormality of the vehicle-state detection device 3 or an abnormality of the signal line between the vehicle-state detection device 3 and the control unit 1 based on the output of the vehicle-state detection device 3. Note that thresholds of multiple levels are set for the abnormality detecting means 10 and the provisional abnormality detecting means 13 performs the provisional abnormality detection using the lowest level threshold among them.

When detecting an abnormality of the vehicle-state detection device 3 or an abnormality of the signal line between the vehicle-state detection device 3 and the control unit 1, the provisional abnormality detecting means 13, unlike the abnormality detecting means 10, notifies the environmental drive condition information obtaining means 11 of the detected abnormality, rather than turning on the indication device 4 as a warning indication nor turning on the audio device 5 to produce a waning sound, and the environmental drive condition information obtaining means 11 obtains, in turn, additional environmental drive condition information for finally determining whether the provisionally detected abnormality really exists.

Figure 7:
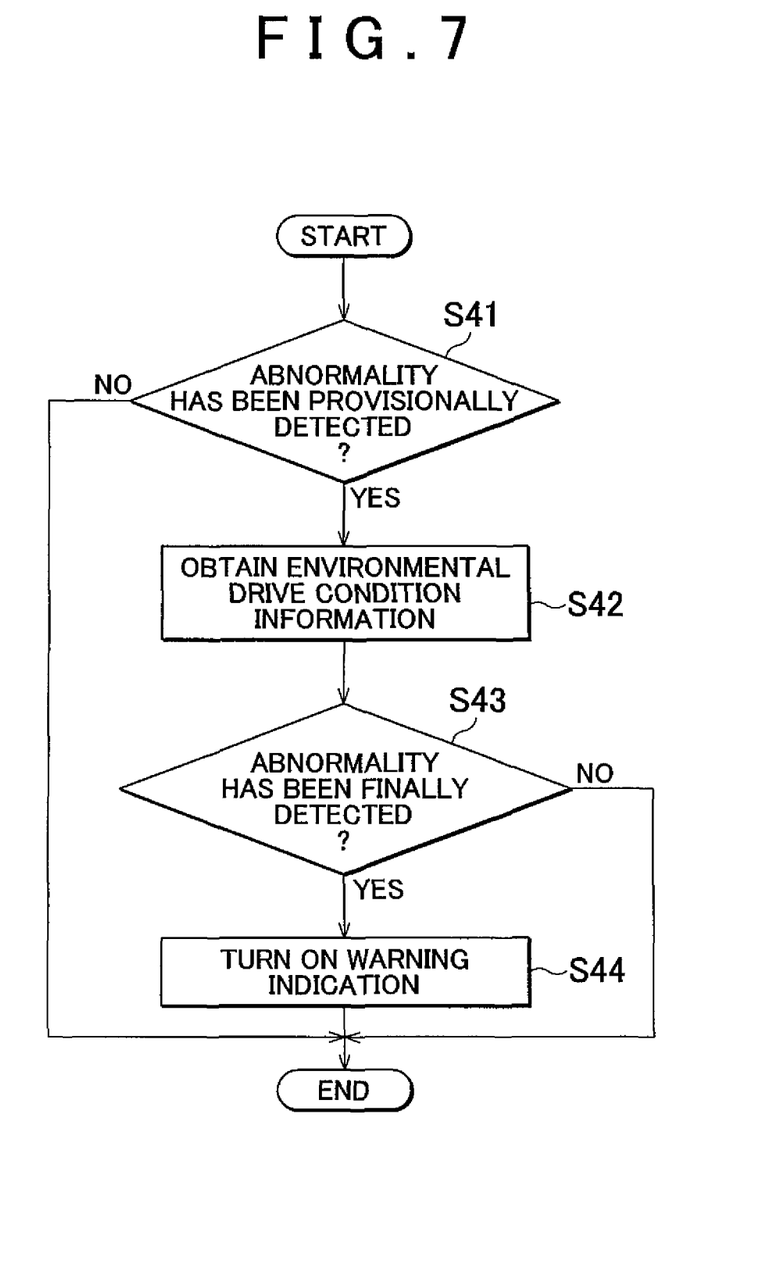
FIG. 7 is a flowchart illustrating the flow of an abnormality detection routine that is executed using provisional abnormality detecting means in the abnormality detection apparatus of the second example embodiment.

Hereinafter, an abnormality detection routine that is executed using the provisional abnormality detecting means 13 will be described with reference to FIG. 7. The flowchart of FIG. 7 illustrates the flow of the sensor abnormality detection routine that the control unit 1 of the abnormality detection apparatus 200 executes to detect an abnormality of the engine coolant temperature sensor. The control unit 1 the abnormality detection apparatus 200 executes the sensor abnormality detection routine at a predetermined time point that is a predetermined time after the engine start (detection time point). In the sensor abnormality detection routine, the detection time point is switched between at least two detection time points; the detection time point used when the outside temperature is higher than a temperature threshold; and the detection time point used when the outside temperature is lower than the temperature threshold.

In the sensor abnormality detection routine, referring to FIG. 7, when the detection time point for determining whether the output value of the engine coolant temperature sensor has exceeded a predetermined level has arrived, the control unit 1 of the abnormality detection apparatus 200 provisionally detects whether the engine coolant temperature sensor is presently in an abnormal state by determining whether the output value of the engine coolant temperature sensor is smaller than a first coolant temperature threshold (step S41). At this time, if the output value of the engine coolant temperature sensor is smaller than the first coolant temperature threshold, the provisional abnormality detecting means 13 provisionally determines that the engine coolant temperature sensor is presently in an abnormal state. On the other hand, if the output value of the engine coolant temperature sensor is equal to or larger than the first coolant temperate threshold, the provisional abnormality detecting means 13 provisionally determines that the engine coolant temperature sensor is not presently in an abnormal state.

If it is provisionally determined in step S41 that the engine coolant temperature sensor is not presently in an abnormal state (step S41: NO), the control unit 1 finishes the sensor abnormality detection routine. That is, in this case, the aforementioned final detection process does not need to be performed to determine that the engine coolant temperature sensor is presently in a normal state.

On the other hand, if it is provisionally determined in step S41 that the engine coolant temperature sensor is presently in an abnormal state (step S41: YES), the control unit 1 controls the environmental drive condition information obtaining means 11 to obtain weather information (including information on the outside temperature) (step S42).

More specifically, at this time, the environmental drive condition information obtaining means 11 requests, using the vehicle communication device 2, the communication center to transmit weather information, whereby the environmental drive condition information obtaining means 11 obtains the latest weather information for the area in which the vehicle is presently running.

Then, the control unit 1 sets a second coolant temperature threshold in accordance with the outside temperature using a look-up table, or the like. The second coolant temperature is used to finally determine whether the provisionally detected abnormality of the engine coolant temperature sensor really exists. The abnormality detecting means 10 makes this final detection by determining whether the output value of the engine coolant temperature is smaller than the second coolant temperature threshold (step S43).

More specifically, at this time, if the output value of the engine coolant temperature sensor is smaller than the second coolant temperature threshold, the abnormality detecting means 10 finally determines that the provisionally detected abnormality of the engine coolant temperature sensor really exists. On the other hand, if the output value of the engine coolant temperature sensor is equal to or larger than the second coolant temperature threshold, the abnormality detecting means 10 finally determines that the provisionally detected abnormality of the engine coolant temperature sensor does not exist.

If the control unit 1 the abnormality detection apparatus 200 fails to obtain weather information from the communication center, the control unit 1 the abnormality detection apparatus 200 may perform the final detection using the initial value of the second coolant temperature threshold, which is recorded in advance, without newly setting the second coolant temperature threshold in accordance with the outside temperature as mentioned above. Alternatively, if the control unit 1 the abnormality detection apparatus 200 fails to obtain weather information from the communication center, the result of the provisional detection by the provisional abnormality detecting means 13 may be used as the final detection result as it is.

If the abnormality detecting means 10 finally determines that the provisionally detected abnormality of the engine coolant temperature sensor really exists (step S43: YES), the control unit 1 then outputs control signals to turn on the indication device 4 (LED lamp) as a warning indication (step S44).

On the other hand, if the abnormality detecting means 10 finally determines in step S43 that the provisionally detected abnormality of the engine coolant temperature sensor does not exist (step S43: NO), the abnormality detecting means 10 finishes the second abnormality detection routine, determining that the engine coolant temperature sensor is presently in a normal state. In this case, the abnormality detecting means 10 does not turn on the indication device 4 (LED lamp).

As described above, the abnormality detection apparatus 200 obtains environmental drive condition information only when an abnormality of the engine coolant temperature sensor has been provisionally detected, and then it finally determines whether the provisionally detected abnormality really exists based on the obtained environmental drive condition information. As such, as well as the advantages obtained by the abnormality detection apparatus 100 described earlier, the abnormality detection apparatus 200 also provides an advantage of reduced communication cost for obtaining environmental drive condition information.

While the abnormality detection apparatus 200 is adapted to detect an abnormality of the engine coolant temperature sensor, it may alternatively be adapted to detect an abnormality of the transmission lubricant temperature, an abnormality of the engine, an abnormality of the signal line of each sensor, and so on.

According to the abnormality detection apparatuses 100, 200, as described above, the detection criteria for detecting an abnormality of the vehicle or an abnormality of an in-vehicle device is changed in accordance with the environmental drive condition information, and therefore the abnormality detection can be properly performed in each environmental drive condition, minimizing the possibility of an erroneous abnormality detection that may otherwise be caused when the detection criteria does not correspond to the present environmental drive condition.

According to the abnormality detection apparatuses 100, 200, further, the loose abnormality detection criteria that is used to cover various environmental drive conditions is made stricter in specific environmental drive conditions, and this reduces the possibility of overlooking of abnormalities.

While the example embodiments of the invention have been described in detail, the invention is not limited to any of these example embodiments. To the contrary, the invention is intended to cover various modifications and equivalent arrangements within the spirit and scope of the invention.

For example, while the abnormality detection apparatuses 100, 200 are adapted to turn on the indication device 4 as a warning indication or turn on the audio device 5 to produce a warning message when an abnormality has been detected, they may alternatively be adapted to activate an emergent vehicle-control mode that, for example, automatically decelerates the vehicle to a predetermined speed or lower in response to an abnormality of the engine being detected. In this case, further, the emergency vehicle-control mode may be cancelled when it is determined that the detected abnormality is actually a signal line disconnection, not an abnormality of the engine.

Further, when it is determined that the signal line of a specific sensor is presently disconnected, the abnormality detection apparatuses 100, 200 may reconfirm the presence of this signal line abnormality by analyzing the correlation between the output of the acceleration sensor provided in the vehicle and the timing of interruptions of signal transmission from the sensor. In this case, for example, the abnormality detection apparatus 100, 200 determines the ratio of signal transmission interruptions that occurred in a state where the longitudinal acceleration detected by the acceleration sensor is equal to or higher than a predetermined value, and the abnormality detection apparatus 100, 200 reconfirms the presence of the signal line abnormality based on the determined ratio. In this case, the reliability of the signal line abnormity detection further improves.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. An abnormality detection apparatus comprising:
   abnormality detection means that detects an abnormality of an in-vehicle device provided in a vehicle based on an output of the in-vehicle device that indicates a state of the vehicle;
   environmental drive condition information obtaining means that obtains information regarding an environmental drive condition that affects the output of the in-vehicle device; and
   abnormality detection criteria changing means that changes an abnormality detection criteria used by the abnormality detection means based on the environmental drive condition information obtained by the environmental drive condition information obtaining means, wherein:
   the environmental drive condition information obtaining means obtains road surface information;
   the abnormality detection criteria changing means changes a target of the abnormality detection by the abnormality detection means between the abnormality of the in-vehicle device and an abnormality of a signal line of the in-vehicle device, based on the road surface information obtained by the environmental drive condition information obtaining means; and the abnormality detection means detects the abnormality of the in-vehicle device or the abnormality of the signal line, based on a frequency of interruption of signal transmission from the in-vehicle device or on a duration of interruption of signal transmission from the in-vehicle device.

2. An abnormality detection apparatus, comprising:

provisional abnormality detection means that provisionally detects an abnormality of a signal line of an in-vehicle device provided in a vehicle based on a comparison of an output of the in-vehicle device that indicates a state of the vehicle to a first detection threshold;

environmental drive condition information obtaining means that obtains information regarding an environmental drive condition that affects the output of the in-vehicle device when the provisional abnormality detection means has detected the abnormality; and abnormality detection means that detects the abnormality of the signal line of the in-vehicle device based on a comparison of the output of the in-vehicle device and a second detection threshold higher in level than the first detection threshold when the provisional abnormality detection means has detected the abnormality;

wherein the second detection threshold is changed based on the environmental drive condition information obtained by the environmental drive condition information obtaining means.

3. The abnormality detection apparatus according to claim 2, wherein the environmental drive condition information obtaining means receives the information regarding the environmental drive condition from an external communication center, a road-to-vehicle communication device, or an in-vehicle navigation system.

4. The abnormality detection apparatus according to claim 3, wherein the environmental drive condition information obtaining means receives the information regarding the environmental drive condition from the external communication center.

5. The abnormality detection apparatus according to claim 3, wherein the environmental drive condition information obtaining means receives the information regarding the environmental drive condition from the road-to-vehicle communication device.

6. The abnormality detection apparatus according to claim 3, wherein the environmental drive condition information obtaining means receives the information regarding the environmental drive condition from the in-vehicle navigation system.

* * * * *